United States Patent [19]
Bell

[11] 3,767,909
[45] Oct. 23, 1973

[54] AUTOMOBILE WHEEL LIGHT ACCESSORY

[76] Inventor: Joseph P. Bell, 5256 Phillips St., Maple Heights, Ohio 44137

[22] Filed: June 26, 1972

[21] Appl. No.: 266,229

[52] U.S. Cl.................. 240/8.12, 240/10.1, 339/5 R
[51] Int. Cl................................................ B60q 1/26
[58] Field of Search......................... 240/8.12, 10.1; 339/5 R, 5 A

[56] References Cited
UNITED STATES PATENTS
| | | | |
|---|---|---|---|
| 2,526,548 | 10/1950 | Franklin............................. | 240/8.12 |
| 2,957,562 | 10/1960 | Rudisch........................... | 339/5 R X |
| 1,808,880 | 6/1931 | Berger............................ | 240/10.1 X |

Primary Examiner—Samuel S. Matthews
Assistant Examiner—Michael Harris
Attorney—J. H. Slough

[57] ABSTRACT

An electric light accessory for permanent attachment to an automobile wheel wherein the light remains stationary in use and is electrified by a ground means and a non-rotating power lead cable operatively interconnected to a power source. The non-rotating electrical light further includes a bearing means junction in the electrical circuit whereby continuous power from the non-rotating power cable feeds the non-rotating light and permits the translucent lens or light enclosure to rotate with the wheel without interrupting the electrical circuit.

11 Claims, 6 Drawing Figures

PATENTED OCT 23 1973 3,767,909

AUTOMOBILE WHEEL LIGHT ACCESSORY

It is desirable to provide illuminated safety lights carried by vehicle wheels for the purpose of providing warning signals of approaching vehicles, particularly when visibility is poor such as at night or in foggy weather. Such wheel lights reduce the hazards of driving and provide significant safety features.

Although illuminated hubcaps or lighted spinners have been suggested before, most prior art structures include a rotating light that rotates with the wheel. A patent issued to J. P. Bell, the present inventor, U.S. Pat. No. 3,099,401, for example, discloses a rotating "spinner" light secured to the wheel hub and is electrified by an electrical cable having a brush means contacting a metal conducting band fixedly positioned on the brake drum. In this and similar prior art structures, the light rotates and receives electrical energy from a power source through a brush means.

The present invention provides a non-rotating light secured to a non-rotating electrical cable interconnected to a power source wherein the electrical circuit includes a bearing means operative to permit rotation of the lens enclosure relative to the light bulb. Accordingly, the light is non-rotating and remains stationary while supported within a translucent lens which rotates with the wheel.

It is therefore a primary object of this invention to provide a non-rotating safety light for permanent attachment to the wheel hub member.

Another object is to provide an electrical circuit providing power to a non-rotatable light secured to a rotating vehicle wheel.

Another object is to provide breakaway or quick disconnect electrical power feed line to a non-rotatable light secured to a vehicle wheel.

Still another object is to provide a non-rotating safety light for vehicle wheels that is virtually free of static loads and thrust loads and is highly durable in use.

A still further object is to provide an attractive wheel safety light simple in construction having a minimum of parts and adapted to be quickly secured to a vehicle wheel.

These and other advantages of this invention will become more apparent from the drawings and detailed description of one form of mechanism embodying my invention, in which drawings.

Figure 1:
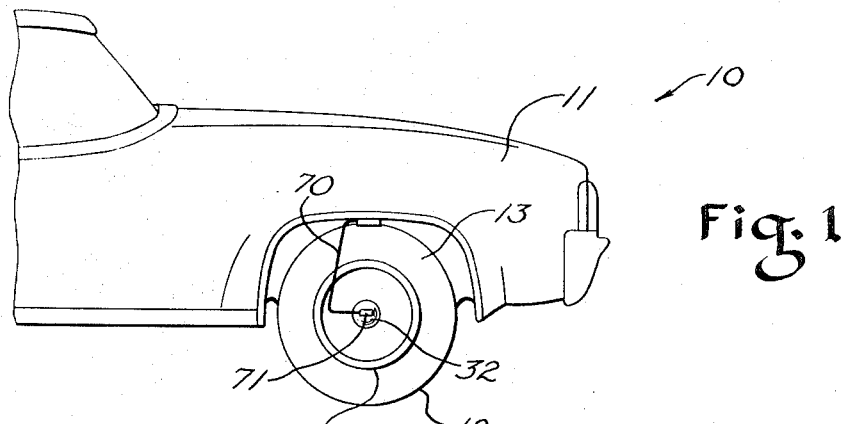
FIG. 1 is an elevational view of a forward portion of an automobile showing thereon the installation of my invention.

Referring now to the drawings wherein like numerals designate like parts, shown is a frontal portion of an automobile 10 having a wheel light secured thereto. The automobile 10 includes a conventional front fender 11 disposed over a front wheel 12 comprising a pneumatic tire 13 conventionally mounted on a steel wheel hub 22. The wheel hub 22 supports the wheel light as hereinafter described.

A wheel cone adapter 23 is removably attached to the wheel hub 22 by a plurality of lug nuts 24 and lug bolts 25. The cone adapter 23 has welded thereto a hollow metallic cone 26 which is disposed over the grease cap 21 of the vehicle wheel 12. The cone 26 includes an outer peripheral edge 27 having a lens adapter 28 secured thereto wherein the lens adapter 28 has a translucent lens 32 attached thereto by a plurality of lens screws 30. Located within the cone 26 is a concave reflector 14 similarly mounted to the lens adapter 28 wherein the reflector 14 is placed inwardly of the lens 32 and spaced outwardly from the grease cap 21. Accordingly, the wheel cone 26, reflector 14, and translucent lens 32 are suitably secured together as a unit whereby the unit rotates with the wheel 12.

Figure 2:
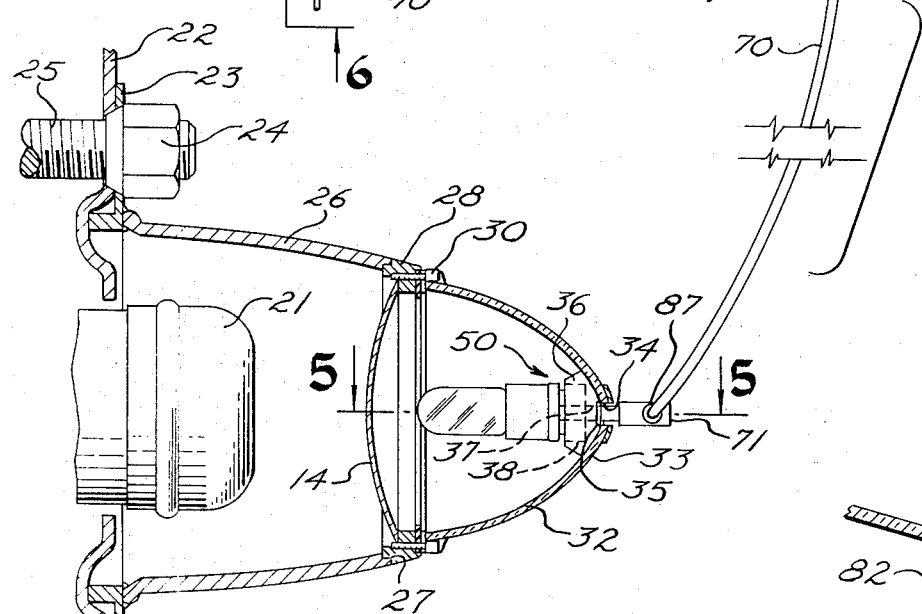
FIG. 2 is an enlarged side elevational and sectional view of the wheel light.
Figure 4:
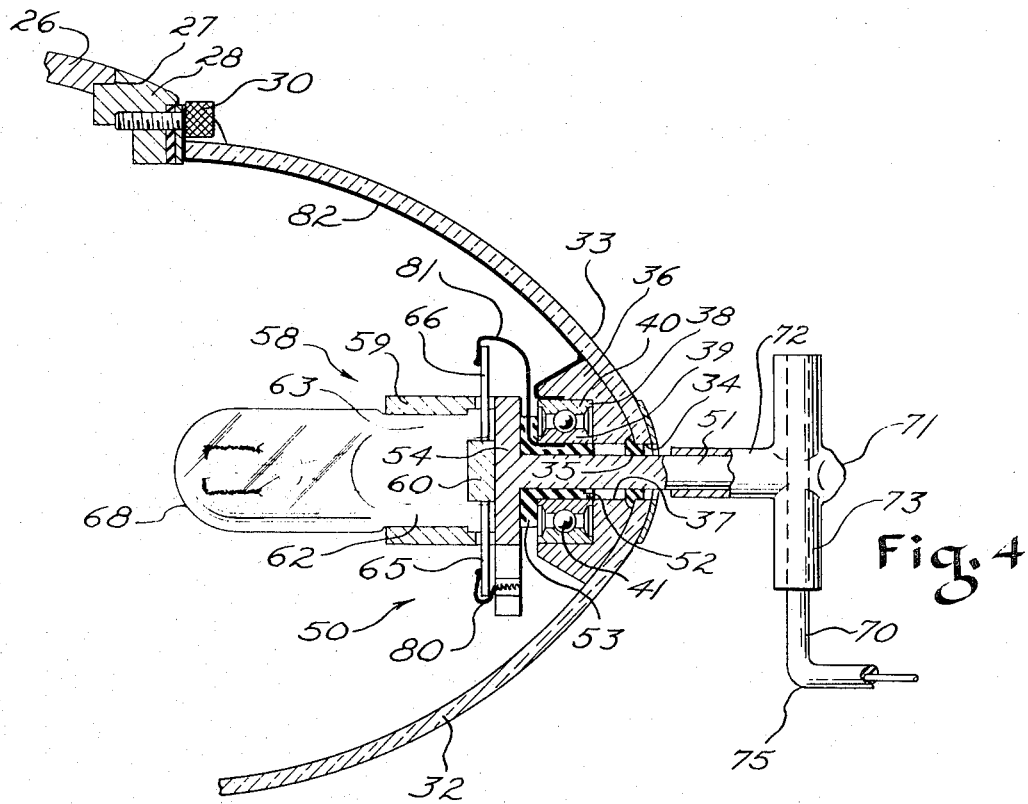
FIG. 4 is an enlarged sectional view taken along the lines 5—5 in FIG. 2.

As viewed in FIGS. 2 and 4, the translucent lens 32 is somewhat conical and includes an outermost apex portion 33 provided with an opening 34 therein. A bearing support means 36 having a lateral throughout opening 37 is located within the lens 32 and is secured thereto around the opening 34 whereby the central opening 37 is in alignment with the opening 34 in the lens 32. A moisture seal 35 is secured to the lens 32 and disposed about the central opening 37 to seal the interior of the lens 32 from moisture. The bearing support means 36 supports bearing means such as a ball bearing means 38 comprising ball bearings 41 supported within inner and outer race members 39 and 40. The inner race member 39 is stationary and is secured to a nylon spacer 52, whereas the outer race member 40 is rotatable and is secured to the bearing support 36 whereby the ball bearings 41 permit relative rotation between lens enclosure 32 and the non-rotating light socket assembly hereinafter described. It should be noted that bearing means such as slip bearings 43 will likewise permit relative rotation between the lens and the light socket, as viewed in FIG. 6. The slip bearings 43 comprise an inner sleeve bearing 44 fixed to the insulator spacer 52 and an outer collar member 45 secured to the bearing support means 36 wherein relative rotation takes place between the sleeve bearing 44 and the collar 45.

The light socket assembly 50 includes a non-rotating metallic shaft 51 extending inwardly and outwardly of the lens 32 through the opening 34 of the lens 32 wherein the inwardly extending portion includes an enlarged T-portion 54. Disposed inwardly of the opening 34 and surrounding the shaft 51, is the nylon insulating sleeve or spacer 52 secured to the shaft 51 supported on the ball-bearing means 38 thereby spacing and electrically insulating the shaft 51 from the ball-bearing means 38. The nylon spacer 52 further includes a lateral collar 53 which engages a lateral portion of the ball-bearing means 38 to prevent lateral slippage outwardly therefrom and to further electrically insulate the ball-bearing means 38 from the enlarged T-portion 54 of the inwardly disposed end of the shaft 51. The enlarged T-portion 54 of the shaft 51 has secured thereto a socket means 58 comprising a cylindrical wall 59 communicating with a central seating member 60. Disposed inwardly of the cylindrical wall 59 and secured thereto is a pair of spaced metal prongs 62, 63. A first adapter lead 65 extends through a small opening in the cylindrical side wall 59 located adjacent to the seating member 60 and engages the first prong 62. Similarly, an exit lead 65 is connected to the second prong 63 and exits on the opposite side of the socket means 58 providing a two-lead circuit to the light bulb 68. The socket means 58 may be adapted to accommodate a particular type of conventional automobile lamp such as, for example, shown herein as a 12 volt direct current auto instrument-indicator G.E. lamp No. 194 having a socket specification SAE J822, or a G.E. No. 97 bulb having a light socket specification of SAE J567B. The metal prongs 62, 63 engage the light bulb 68 and further serve to provide an electrical circuit to the bulb.

Referring now to the electrical circuit for the wheel light, a power source such as a battery provides electrical power to the wheel light by a hot lead wire electrically interconnected to a rigidly formed descending lead 70 disposed between the fender 11 and the safety light secured to the vehicle wheel 12. The lower portion of the descending lead wire 70 engages a T-connector 71 having a stem 72 which is a quick disconnect junction with the shaft 51 whereby the formed lead wire 70 and T-connection 71 may be quickly disconnected from the wheel light. The T-connector 71 further includes an input junction 73 to engage the formed lead wire 70 which preferably includes a right-angle bend 75 just prior to entering the input junction 73. The input junction 73 permits limited axial rotation with the wire 70 relative to the axis of the input junction 73. Accordingly, the formed descending lead wire 70 and the T-connector 71 are particularly adapted for quick removal from the wheel light and to permit desirable axial rotation about the axis of the input junction 73 sufficient to absorb ordinary lateral and impact movements of the wheel, in addition to providing electrical power to the wheel light.

Figure 6:
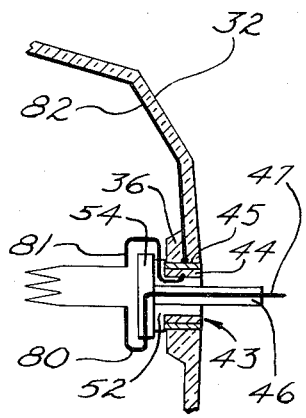
FIG. 6 is a simplified view similar to FIG. 4 of another embodiment of the invention.

The electrical circuit within the safety light comprises the metallic shaft 51 communicating with the depending T-portion 54 thereof which is interconnected to a short lead wire 80 secured to the first adapter lead 65 of the first metal prong 62 to supply electrical power to the input junction of the light bulb 68. In FIG. 6, shown is a non-conductive shaft 46 having an electrically conductive wire 47 disposed therein for connection to the lead wire 80. The output junction of the light bulb 68 engages the second metal prong 63 in contact with the exit or second adapter lead 66 which is interconnected to an exit lead wire 81. The exit wire 81 is disposed within the collar portion 53 of the nylon insulating spacer 52 wherein said lead 81 terminates in electrical contact with the stationary inner race member 39 of the ball-bearing means 38. The stationary inner race 39 is conductive and transmits electrical energy through the plurality of ball bearings 41 to the outer rotating race member 40. The outer rotating race member 40 is likewise conductive and completes the circuit with the power source with a ground wire 82 secured to the inner surface of the lens 32 and electrically connected to the lens adapter 28, wheel cone 26, the wheel 22 which is negatively grounded to the vehicle body 10 in a conventional manner. in like manner, a slip bearing means 43 is operative to complete the electrical circuit in addition to providing mechanical rotation between the lens and light, as viewed in FIG. 6. Accordingly, the bearing means advantageously facilitates axial rotation of the lens enclosure relative to the non-rotating portion of the wheel light in addition to closing the electrical circuit.

Figure 3:
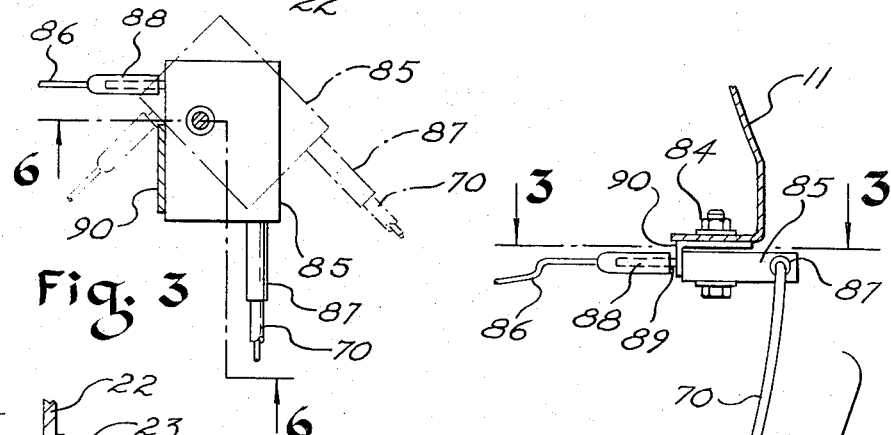
FIG. 3 is a view taken along the lines 3—3 in FIG. 2.
Figure 5:
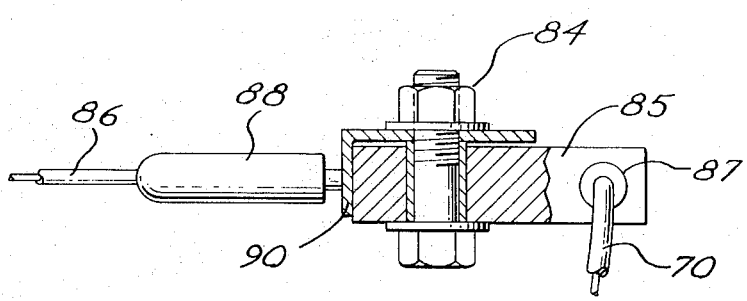
FIG. 5 is a sectional view taken along the lines 6—6 in FIG. 3.

Referring now to the upper portion of the forward hub lead 70 as viewed in FIG. 2, the lead 70 is detachably connected to an insulating housing 85 pivotally mounted to the fender 11 by bolting means 84 and further electrically connected to an electrical power source lead 86. FIG. 5 indicates a push-pull connector 87 providing a quick-disconnect junction with the forward lead 70 and further adapTed to permit axial rotation movement of the lead 70 within the connector 87. The pivotal movement of the insulated housing about the bolting means 84 is indicated in broken lines in FIG. 3. The electrical input terminal 89 of the insulated housing 85 engages the electrical power source lead 66 through a protective rubber cup 88 thereby completing the circuit through the insulated housing 85. The pivotal movement of the insulated housing may be limited by a mounting plate 90 whereby sufficient movement of the insulated housing 85 accommodates normal movements of the fender 11 relative to the wheel 12, but limits such movements thereof to prevent occassional abnormal movements and thus avoid damage to the wheel light assembly.

In use, the formed lead wire 70 is preferably located by first turning the forward vehicle wheel wherein the forward portion thereof is turned inwardly and the rearward portion of the wheel is exposed from the fender well. The major descending portion of the formed lead wire 70 may then be spaced about three-eighths inch from the sidewall of the wheel tire. The axial rotatable junction 87 and pivotal movement of the housing 85 in combination with the biaxial rotatable T-connector 71 and the formed lead wire 70 advantageously permits a full turn of the wheel and expediently accommodates normal movements between the wheel and fender, and yet the rigidity of the formed lead wire 70 will adjust slightly inwardly toward the tire in response to outward lateral movement of the tire.

The foregoing preferred embodiment of the wheel light of this invention provides continuous power to a non-rotating illuminated lamp by an electrical circuit preferably comprising a formed hot lead wire interconnected with the lamp and a ground wire wherein the circuit therebetween is completed through a conducting bearing means which advantageously permits relative rotational movement between the non-rotating lamp and the rotating lens enclosure assembly secured to the vehicle wheel. All obvious variations and modifications are contemplated and included within the spirit and scope of the invention as defined in the appended claims.

What I claim is:

1. A vehicle wheel electric light accessory for attachment to a vehicle wheel, comprising a lens having an opening therein; shaft means projecting through said opening and extending inwardly and outwardly of said lens; said shaft means including electrically conductive means and being adapted to be connected to a source of electrical current; bearing means operative to permit relative rotation between said shaft means and said lens, said bearing means being electrically conductive; an insulating sapcer means disposed over said shaft means and insulating said shaft means from said bearing means; an insulated light socket having a pair of electrical terminals, one of said terminals being connected to said conductive means of said shaft member; means partially disposed in said spacer means electrically connecting the other of said terminals to said bearing means; and said bearing means connected to means for completing a circuit with said source of electrical current.

2. A vehicle wheel light as set forth in claim 1 wherein the bearing means is a ball bearing assembly comprising an inner race member, a plurality of ball bearings, and an outer race member; said inner race member being in electrical contact with said socket means, and said outer race member being in electrical contact with said means for completing the circuit, said last mentioned means comprising a ground wire.

3. A vehicle light as set forth in claim 1 wherein the bearing means comprises an inner sleeve bearing and an outer bearing means, said inner sleeve bearing being in electrical contact with said socket means, and said outer bearing means being in contact with said means for completing the circuit.

4. A vehicle wheel light as set forth in claim 1 wherein said shaft means is electrically conductive.

5. The vehicle wheel light as set forth in claim 4 including a T-connector having a stem member and an angled member; said stem connected to the outwardly disposed portion of said sahft; and a formed rigid electrical lead connected to the angled member and adapted to be interconnected to a power source said rigid lead and said T-connector holding said shaft means against rotation whereby said lens can rotate with respect to said shaft means.

6. The vehicle wheel light as set forth in claim 5 wherein the angled member includes a push-pull connection whereby the formed lead may be quickly disconnected therefrom.

7. The vehicle wheel light as set forth in claim 5 wherein the formed rigid electrical lead wire includes an angle bend substantially adjacent to connection with the angle member of the T-connector.

8. The vehicle wheel light as set forth in claim 5 including an insulated housing adapted to be pivotally mounted to a vehicle and including an input terminal and an output terminal; said output terminal connected to said formed rigid lead wire, and said input terminal connected to a power source.

9. The vehicle wheel light set forth in claim 8 wherein said output terminal includes a quick disconnect junction for securing the formed rigid lead cable to the input junction.

10. A vehicle wheel electric light accessory for attachment to a vehicle wheel, comprising a lens having a central opening therein and forming at least part of a light enclosure; an electrically conductive shaft projecting through said opening and extending inwardly and outwardly of said lens; a formed rigid lead wire connected at one end to the outer end of said shaft and having means at the other end thereof for mounting to a vehicle; electrically conductive bearing means carried by said lens operative to permit rotation of said lens with respect to said shaft; an insulating spacer disposed over said shaft and insulating said shaft from said bearing means; an insulated light socket mounted on the inner end of said shaft, said socket having a pair of electrical terminals, one of said terminals being connected to said shaft; means partially disposed in said insulating spacer electrically connecting the other of said terminals to said bearing means; said bearing means connected to means for completing a circuit with said source of electrical current; and means for mounting said lens coaxially to a vehicle wheel whereby said lens is adapted to rotate with respect to said shaft as the wheel turns.

11. A vehicle wheel electric light accessory for attachment to a vehicle wheel, comprising: a translucent lens enclosure including an outwardly extending portion having an opening in said outwardly extending portion; a shaft member in said opening disposed inwardly and outwardly of said lens enclosure; said shaft member including electrically conductive means and being adapted to be interconnected to a power source; a bearing means operative to permit relative rotation between said shaft member and said lens enclosure, said bearing means being electrically conductive; an insulating sleeve member disposed over said shaft member for insulating siad shaft member from said bearing means; an insulated light socket means having a pair of electrical terminals, one of said terminals being interconnected with said conductive means of said shaft member; means partially disposed in said insulating sleeve electrically interconnecting the other of said terminals of said socket means with said bearing means; said bearing means connected to means for completing the circuit with the power source; and means for securing the translucent lens to the vehicle wheel.

* * * * *

UNITED STATES PATENT OFFICE
CERTIFICATE OF CORRECTION

Patent No. 3,767,909                    Dated October 23, 1973

Inventor(s)    Joseph P. Bell

It is certified that error appears in the above-identified patent and that said Letters Patent are hereby corrected as shown below:

Column 2, line 19, :throughout" should be ---throughput---.

Column 2, line 66, "exit lead 65" should be ---exit lead 66"

Signed and sealed this 16th day of April 1974.

(SEAL)
Attest:

EDWARD M. FLETCHER, JR.                C. MARSHALL DANN
Attesting Officer                      Commissioner of Patents